(12) United States Patent
Chen et al.

(10) Patent No.: US 12,237,543 B2
(45) Date of Patent: Feb. 25, 2025

(54) BATTERY, BATTERY MODULE AND ELECTRIC EQUIPMENT

(71) Applicant: CONTEMPORARY AMPEREX TECHNOLOGY (HONG KONG) LIMITED, Hong Kong (CN)

(72) Inventors: Yuanbao Chen, Ningde (CN); Quankun Li, Ningde (CN); Peng Wang, Ningde (CN); Lingyan Jiang, Ningde (CN)

(73) Assignee: Contemporary Amperex Technology (Hong Kong) Limited, Hong Kong (CN)

( * ) Notice: Subject to any disclaimer, the term of this patent is extended or adjusted under 35 U.S.C. 154(b) by 0 days.

(21) Appl. No.: 17/059,076

(22) PCT Filed: Aug. 10, 2020

(86) PCT No.: PCT/CN2020/108155
§ 371 (c)(1),
(2) Date: Nov. 25, 2020

(87) PCT Pub. No.: WO2021/203599
PCT Pub. Date: Oct. 14, 2021

(65) Prior Publication Data
US 2021/0359379 A1  Nov. 18, 2021

(30) Foreign Application Priority Data

Apr. 9, 2020  (CN) .......................... 202010274181.2

(51) Int. Cl.
*H01M 50/533* (2021.01)
*H01M 50/152* (2021.01)
(Continued)

(52) U.S. Cl.
CPC ....... *H01M 50/533* (2021.01); *H01M 50/152* (2021.01); *H01M 50/543* (2021.01);
(Continued)

(58) Field of Classification Search
CPC ............. H01M 50/533; H01M 50/645; H01M 50/591; H01M 50/152; H01M 50/543;
(Continued)

(56) References Cited

U.S. PATENT DOCUMENTS 7,919,206 B2 *  4/2011  Lee ..................... H01M 50/528
                                                        429/170
2010/0092860 A1 *  4/2010  Seo ..................... H01M 50/528
                                                        429/178
(Continued)

FOREIGN PATENT DOCUMENTS

CN  102130319 A  7/2011
CN  102969523 A  3/2013
(Continued)

OTHER PUBLICATIONS

English Machine Translation of Ito et al. (JP 5724807 B2) (Year: 2015).*
(Continued)

*Primary Examiner* — Matthew T Martin
*Assistant Examiner* — Adam J Francis
(74) *Attorney, Agent, or Firm* — STERNE, KESSLER, GOLDSTEIN & FOX P.L.L.C.

(57) ABSTRACT

The present application relates to the field of batteries, in particular to a battery, a battery module and an electric equipment. The battery of the present application includes: a connection member, including a first connection portion configured to be electrically connected with an electrode assembly and a second connection portion configured to be electrically connected with an electrode terminal, and the (Continued)

first connection portion is in a folded state along a crease relative to the second connection portion; the crease is arranged between a first end face and a second end face of the first connection portion; and when the connection member is in an expanded state, the second end face and the first end face are arranged along a length direction.

13 Claims, 10 Drawing Sheets

(51) Int. Cl.
   *H01M 50/543*  (2021.01)
   *H01M 50/591*  (2021.01)
   *H01M 50/645*  (2021.01)
(52) U.S. Cl.
   CPC ....... *H01M 50/591* (2021.01); *H01M 50/645* (2021.01); *H01M 2220/20* (2013.01)
(58) Field of Classification Search
   CPC ........... H01M 2220/20; H01M 50/179; H01M 50/30; H01M 50/586; H01M 50/593; H01M 50/528; H01M 50/538; H01M 50/559; H01M 50/627; H01M 50/636; H01M 50/107; H01M 50/213; H01M 10/0525; H01M 10/0422; H01M 10/058
   See application file for complete search history.

(56) References Cited

U.S. PATENT DOCUMENTS

| | | | |
|---|---|---|---|
| 2011/0171516 A1 | 7/2011 | Byun et al. | |
| 2012/0052366 A1* | 3/2012 | Park | H01M 50/502 429/158 |
| 2012/0301756 A1 | 11/2012 | Fuhr et al. | |
| 2013/0052487 A1 | 2/2013 | Park | |
| 2016/0226056 A1* | 8/2016 | Masson | H01M 4/661 |
| 2016/0308177 A1 | 10/2016 | Jang et al. | |
| 2016/0343997 A1 | 11/2016 | Sekiya et al. | |
| 2017/0200567 A1* | 7/2017 | Kim | H01G 11/70 |
| 2019/0067649 A1 | 2/2019 | Li et al. | |
| 2019/0103596 A1 | 4/2019 | Muroya et al. | |
| 2020/0119363 A1* | 4/2020 | Honda | H01M 10/0562 |
| 2021/0083256 A1 | 3/2021 | Liu et al. | |
| 2021/0351484 A1* | 11/2021 | Tsushima | H01M 4/043 |
| 2022/0153147 A1* | 5/2022 | Muroi | H01M 50/107 |

FOREIGN PATENT DOCUMENTS

| | | | | |
|---|---|---|---|---|
| CN | 106058134 A | | 10/2016 | |
| CN | 106299226 A | | 1/2017 | |
| CN | 206849871 U | | 1/2018 | |
| CN | 108281578 A | | 7/2018 | |
| CN | 207602414 U | * | 7/2018 | |
| CN | 108428921 A | | 8/2018 | |
| CN | 207938703 U | | 10/2018 | |
| CN | 109360932 A | | 2/2019 | |
| CN | 109585770 A | | 4/2019 | |
| JP | S56109271 U | | 8/1981 | |
| JP | H08124547 A | | 5/1996 | |
| JP | H11297301 A | | 10/1999 | |
| JP | 2004-119329 A | | 4/2004 | |
| JP | 2005079051 A | | 3/2005 | |
| JP | 2010-086776 A | | 4/2010 | |
| JP | 5724807 B2 | | 5/2015 | |
| JP | 2015181196 A | * | 10/2015 | ............ H01G 11/28 |
| WO | 2019114780 A1 | | 6/2019 | |
| WO | 2020026649 | | 2/2020 | |

OTHER PUBLICATIONS

Extended European Search Report issued in European Application No. 20808003.6, mailed Aug. 23, 2021, 9 pages.
Office Action issued in Chinese Application No. 202010274181.2, mailed Jun. 2, 2022, 20 pages.
Chongya Muju Sheji yu Zhizao, "Design and Manufacture of Impact Die," 2019, 8 pages.
Decision to Grant a Patent for Japanese Patent Application No. 2022-536845, mailed Oct. 24, 2023, 3 pages.
Decision to Grant a Patent for Korean Patent Application No. 10-2022-7019152, mailed Dec. 21, 2023, 10 pages.
Notice Reasons for Refusal issued by JPO for Japanese Application No. 2023-195792, mailed Nov. 26, 2024, 10 pages.

* cited by examiner

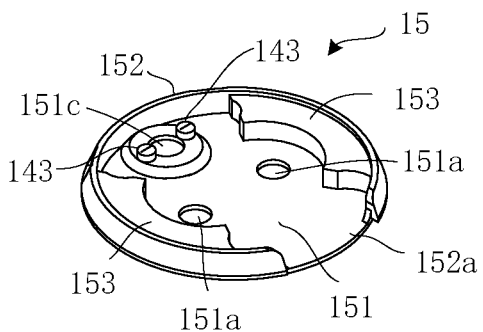
Fig. 24
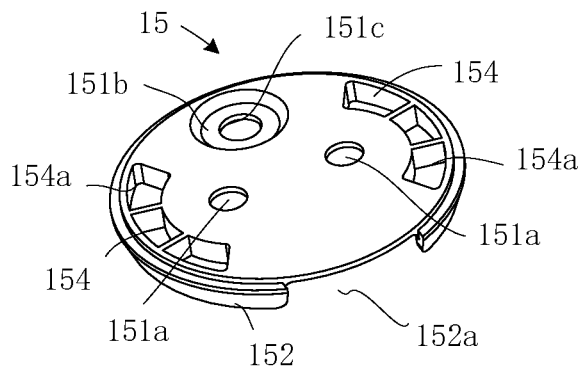
Fig. 25
S110 — Bending a connection portion relative to a second connection portion at a position between a first end face and a second end face of the first connection portion
Fig. 26

BATTERY, BATTERY MODULE AND ELECTRIC EQUIPMENT

CROSS-REFERENCE TO RELATED APPLICATIONS

The present application is based on and claims the priority of the Chinese application No. 202010274181.2 and filed on Apr. 9, 2020, whose entire contents are incorporated herein by reference.

TECHNICAL FIELD

Embodiments of the present application relate to the field of batteries, in particular to a battery, a battery module and an electric equipment.

BACKGROUND

Owing to such advantages as high energy density, high power density, multiple cycles and long storage time, a cylindrical lithium-ion battery and other secondary batteries are widely used in electric vehicles (for example, electric cars, electric tricycles or electric bicycles), etc.

In secondary batteries such as cylindrical lithium-ion batteries, electrolyte enters between electrode plates of a cell via an end face of the cell, thus realizing an infiltration process.

In related technologies, the infiltration efficiency of the battery still needs to be improved.

SUMMARY OF THE INVENTION

Embodiments of the present application aim at providing a battery, a battery module, an electric equipment and a manufacturing method of the battery, to improve the infiltration efficiency of the battery.

The battery provided in the embodiments of the present application includes:

a connection member, including a first connection portion configured to be electrically connected with an electrode assembly and a second connection portion configured to be electrically connected with an electrode terminal, wherein the first connection portion is in a folded state along a crease relative to the second connection portion;

wherein the crease is arranged between a first end face and a second end face of the first connection portion; and when the connection member is in the expanded state, the second end face and the first end face are arranged along a length direction.

In some embodiments, a first notch is arranged on a side of the first connection portion adjacent to the second connection portion, and the crease extends to the first notch.

In some embodiments, when the connection member is in the expanded state, the first notch extends along the length direction or along a direction intersected with the length direction.

In some embodiments, the second end face is far away from the second connection portion relative to the first end face, and along a direction from the first end face to the second end face, the first notch inclines towards a middle of a width direction of the connection member.

In some embodiments, the first notch includes an arc-shaped notch part, and an outline of the arc-shaped notch part is arc-shaped.

In some embodiments, the first connection portion includes a protruding part, and the protruding part protrudes out of the second connection portion along a width direction of the connection member.

In some embodiments, the connection member includes a connecting part, the connecting part is configured to be connected with the electrode assembly, and when the connection member is in the expanded state, the connecting part protrudes out of the crease along a direction from the first connection portion to the second connection portion.

In some embodiments, a projection of the connection member is not overlapped with a projection of an injection hole along an axial direction of the injection hole, wherein the injection hole is configured to allow electrolyte to be injected.

In some embodiments, the projection of the connection member is not overlapped with a projection of a hole plug along the axial direction of the injection hole, wherein the hole plug extends into the injection hole and penetrates out from a side of the injection hole adjacent to the electrode assembly.

In some embodiments, the battery further includes a protection member configured to prevent the hole plug from contacting with the connection member.

In some embodiments, the battery further includes a first insulating member, wherein the first insulating member is arranged at a side of an end cover of the battery adjacent to the electrode assembly, the first insulating member includes an insulating body and a limiting ring, and the limiting ring protrudes toward a direction close to the electrode assembly relative to the insulating body, and is arranged on a periphery of the connection member, so as to prevent the connection member from contacting with a case of the battery.

In some embodiments, the limiting ring is arranged on a periphery of an end, adjacent to the end cover, of a tab of the electrode assembly.

In some embodiments, the first insulating member includes a supporting part disposed on the insulating body, and the supporting part protrudes from the insulating body towards a direction where the electrode assembly is located, and is supported between the insulating body and the first connection portion.

In some embodiments, the supporting part and an inner surface of the limiting ring are arranged at intervals, or the supporting part is in contact with an inner surface of the limiting ring.

In some embodiments, the insulating body is provided with a weight reduction groove, and the weight reduction groove is concave towards a direction where the electrode assembly is located from an end face of the insulating body far away from the electrode assembly.

In some embodiments, the battery includes an end cover, wherein the end cover includes a body part, a first boss and a second boss, the first boss protrudes from the body part towards a side where the electrode assembly is located, the second boss protrudes from the first boss towards a side where the electrode assembly is located, and the injection hole penetrates through the first boss and the second boss.

The battery module provided in the embodiments of the present application includes the battery in the embodiments of the present application.

The electric equipment provided in the embodiments of the present application includes the battery module in the embodiments of the present application, wherein the battery module is configured to provide electric energy.

Other characteristics and advantages of the present application will become clear through a detailed description of the exemplary embodiments of the present application with reference to the accompanying drawings below.

BRIEF DESCRIPTION OF THE DRAWINGS

In order to more clearly illustrate technical solutions in embodiments of the present application or in the prior art, a brief introduction will be given below on accompanying drawings which need to be used in the description of the embodiments or the prior art. Apparently, the accompanying drawings described below are merely some embodiments of the embodiments of the present application. Those skilled in the art can obtain other accompanying drawings according to these drawings without any creative effort.

FIG. 24 shows a first perspective view of a first insulating member in some other embodiments of the present application.

FIG. 25 shows a second perspective view of the first insulating member shown in FIG. 24.

FIG. 26 shows a manufacturing method of a battery in an embodiment of the present application.

DETAILED DESCRIPTION OF THE EMBODIMENTS

Figure 1:
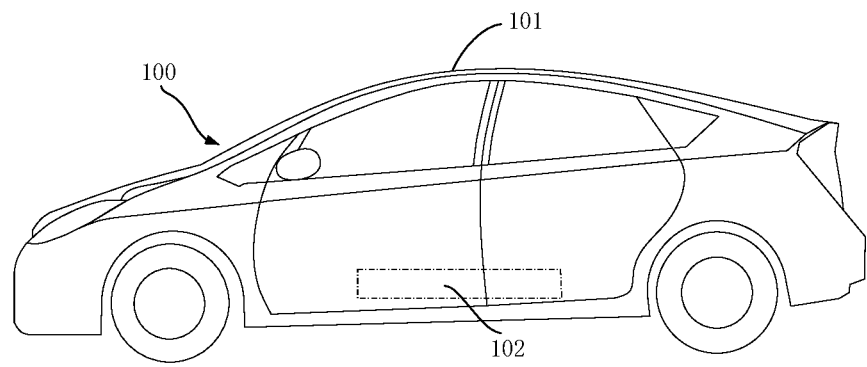
FIG. 1 shows a structural schematic diagram of an electric equipment in some embodiments of the present application.

A clear and complete description will be given below on the technical solutions in the embodiments of the present application in combination with the accompanying drawings in the embodiments of the present application below, and apparently the embodiments described below are only a part but not all of the embodiments of the present application. The description of at least one exemplary embodiment below is merely illustration, rather than serving as any limitation to the embodiments of the present application and applications or uses thereof. Based upon the embodiments of the present application, all the other embodiments which can occur to those skilled in the art without any inventive effort shall fall into the protection scope of the embodiments of the present application.

The techniques, methods and devices known to those of ordinary skills in the art may not be discussed in detail, however, under appropriate conditions, the techniques, methods and devices should be deemed as a part of the authorized description.

In the description of the embodiments of the present application, it should be understood that, the defining of components and parts by such terms as "first" and "second" are merely for the convenience of distinguishing corresponding components and parts, unless otherwise stated, the above terms have no special meanings, therefore, such terms cannot be understood as a limitation to the protection scope of the embodiments of the present application.

In addition, the technical features involved in different embodiments of the present application described below can be combined mutually as long as they do not conflict with each other.

A battery generally includes a case, an electrode assembly, an electrode terminal and a connection member and the like. The electrode assembly is arranged in the case, and electrically connected with the electrode terminal through the connection member. The electrode terminal is exposed out of the case, and is configured to be electrically connected with an external circuit.

The electrolyte is injected into the case, enters between electrode plates of the electrode assembly, and performs an electrochemical reaction with active substances on the electrode plate, thereby generating a charge-discharge process.

The process in which electrolyte enters an electrode assembly is called an infiltration process, and the speed at which the electrolyte enters an electrode assembly is called infiltration efficiency.

In the process of practicing the embodiments of the present application, the inventor found that, in some batteries such as a cylindrical lithium-ion battery, the connection member is configured to be bendable, and in the related technology, the bent connection member shields more of the end face of the electrode assembly, thereby influencing the infiltration efficiency.

Based on the above findings, in the embodiments of the present application, the structure of the battery is improved, so as to improve the infiltration efficiency of the battery.

FIGS. 1-26 schematically show the structures of the electric equipment, the battery module and the battery in the embodiments of the present application and a manufacturing method of the battery.

To clearly describe each orientation below, firstly each direction is defined with a coordinate system in FIG. 2, wherein a coordinate axis L represents a first direction, which is an arrangement direction of a first connection portion 131 and a second connection portion 132 when the connection member 13 is in an expanded state, and, in some embodiments, which is also a length direction of the connection member 13 in an expanded state; a coordinate axis H represents a second direction which is vertical to the first direction L and a third direction W, the second direction H is a stacking direction of the first connection portion 131 and the second connection portion 132 when the connection member 13 is in a folded state, and, in some embodiments, the second direction H is also a height direction of the battery module 102, the thickness direction of the connection member 13, and the axial direction of the battery 10; and the coordinate axis W represents the third direction, which is vertical to the first direction L and the second direction H, and in some embodiments, which is also the width direction of the connection member 13.

However, it should be understood that, the above-mentioned definitions of orientations are merely to facilitate description of embodiments of the present application and for simplified description, in the absence of a contrary illustration, these orientation terms do not indicate or imply that the device or element referred to must be located in a certain orientation or must be constructed or operated in a certain orientation, therefore, the terms cannot be understood as a limitation to the protection scope of the embodiments of the present application.

Referring to FIG. 1, the embodiments of the present application provide an electric equipment 100 which takes a battery module 102 as a power source. The electric equipment 100 includes an equipment body 101 and a battery module 102. The battery module 102 is arranged on the equipment body 101 to provide electric energy.

The electric equipment 100 is, for example, a mobile device such as a vehicle, a ship, a small aircraft, and includes a power source. The power source includes the battery module 102, and the battery module 102 is configured to provide electric energy, thereby providing a driving force for the electric equipment 100. In some embodiments, the driving force of the electric equipment 100 is totally electric energy, at this time, the power source only includes the battery module 102. In some other embodiments, the driving force of the electric equipment 100 includes electric energy and other energies (for example, mechanical energy), at this time, the power source includes the battery module 102 and other power equipment such as an engine. Referring to FIG. 1, taking a vehicle as an example, in some embodiments, the electric equipment 10 is a new energy vehicle, such as a battery electric vehicle, a hybrid electric vehicle, an extended-range vehicle, an electric tricycle or a two-wheeled electric vehicle.

In addition, the electric equipment 100 may be an energy storage device such as a battery cabinet, and include the battery module 102. The number of the battery module 102 may be one, two or multiple, such that the battery cabinet can output electric energy.

Therefore, as long as including the battery module 102, electric equipment 100 falls within the protection scope of the embodiments of the present application.

Figure 2:
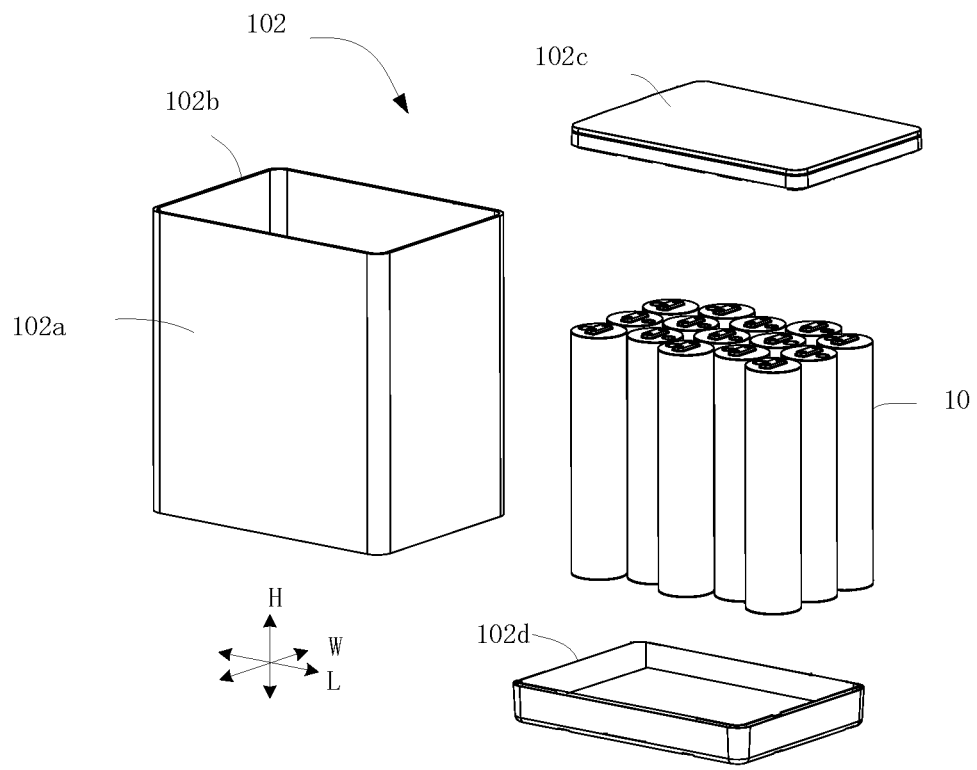
FIG. 2 shows an exploded view of a battery module in FIG. 1.

Referring to FIG. 2, the battery module 102 includes a box 102a and a battery 10, and the battery 10 is accommodated in the box 102a.

The box 102a includes a sleeve 102b, a first box cover 102c and a second box cover 102d. The sleeve 102b, which is an aluminum case for example, is hollow inside, and open at two ends opposite to each other along the second direction H. The first box cover 102c and the second box cover 102d are respectively covered on the two ends of the sleeve 102b that are opposite to each other along the second direction H, to close these two ends, which are opposite along the second direction H, of the sleeve 102b, such that a closed space is formed inside the box 102a, to accommodate the battery 10, etc. The "closed" herein means cover or close, and may be sealed or unsealed.

When used on a two-wheeled electric car and other electric equipment 10, generally, the first box cover 102c is on the top, and the second box cover 102d is on the bottom, that is, the first box cover 102c is a top cover, while the second box cover 102d is a bottom cover. During use, through opening and closing the first box cover 102c, batteries 10 and other structural parts inside the box 102a are maintained or replaced.

The shapes of the box 102a can be varied, for example, referring to FIG. 2, in some embodiments, the box 102a is overally of a cubic shape. The sleeve 102b is of a cubic shape which is hollow and open at two ends, and includes four side plates which are connected end to end in sequence, the four side plates are enclosed to form a cavity, and two adjacent side plates are vertical to each other. A height direction of the sleeve 102b is along the second direction H. The shape of the first box cover 102c is matched with the shape of the opening on the top of the sleeve 102b. The shape of the second box cover 102d is matched with the shape of the opening at the bottom end of the sleeve 102b.

The battery 10 is accommodated in the box 102a, is a core structural part of the battery module 102 and is configured to provide electric energy. The number of the battery 10 may be one, two or multiple. For example, referring to FIG. 2, in some embodiments, multiple batteries 10 are disposed in the box 102a, so as to provide more electric energies.

Figure 3:
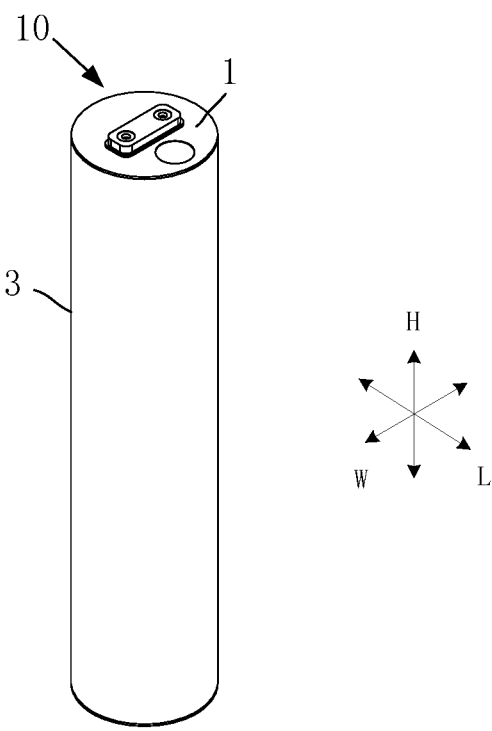
FIG. 3 shows a perspective view of the battery in FIG. 2.
Figure 4:
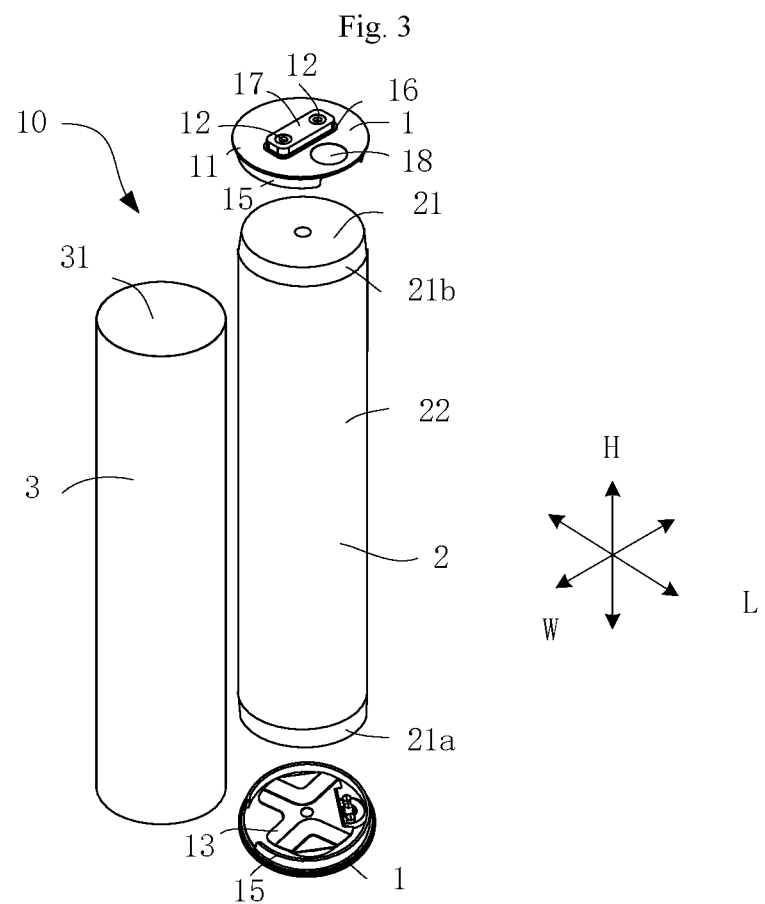
FIG. 4 shows an exploded view of the battery in FIG. 3.

Referring to FIGS. 2-4, in some embodiments, the battery 10 is a cylindrical battery with an axial direction along the second direction H, and the battery 10 includes a case 3, an electrode assembly 2 and a top cover assembly 1, etc.

The case 3 is internally provided with a cavity 31 configured to accommodate the electrode assembly 2, etc. In the cylindrical battery, the case 3 is configured to be cylindrical.

The electrode assembly 2 is arranged in the cavity 31 of the case 3, and for example is formed by stacking or winding of a first electrode plate, a second electrode plate and an insulating spacer arranged between the first electrode plate and the second electrode plate. One of the first electrode plate and the second electrode plate is served as a positive electrode plate, while the other one is served as a negative electrode plate, and the first electrode plate and the second electrode plate both have a first part coated with an active substance and a second part which extends outwards from the first part and is not coated with the active substance. Specifically, referring to FIG. 4, the electrode assembly 2 includes a cell body 22 and a tab 21. Wherein, the cell body 22 is coated with the active substance, corresponds to the first part of the first electrode plate and the second electrode plate, and is configured to generate electric energy. The tab 21 is arranged at the end part of the cell body 22, and extends from the cell body 22 to the outside, and the tab 21 is not coated with the active substance, corresponds to the second part of the first electrode plate and the second electrode plate, and is configured to transmit outside the electric energy generated by the cell body 22.

The tab 21 generally includes a first tab 21a and a second tab 21b, one of the first tab 21a and the second tab 21b serves as a positive tab, and the other one serves as a negative tab. Referring to FIG. 4, in some embodiments, the first tab 21a and the second tab 21b are respectively arranged at two opposite ends, along the second direction H, of the battery body 22. Moreover, referring to FIG. 4, in some embodiments, in a direction far away from the cell body 22, the cross sectional areas of the first tab 21a and the second tab 21b are both gradually decreased, and narrow towards the center of the electrode assembly 2.

The end cover assembly 1 is disposed at the end part of the case 3 to close the cavity 31, so as to protect the electrode assembly 2 and seal the case 3. When the first tab 21a and the second tab 21b are respectively arranged at two opposite ends of the battery body 22 along the second direction H, the battery 10 includes two end cover assemblies 1, the two end cover assemblies 1, respectively corresponding to the first tab 21a and the second tab 21b, are respectively covered at two opposite ends of the case 31 along the second direction H, and the two end cover assemblies 1 may also be referred to as a first end cover assembly and a second end cover assembly for the convenience of distinguishing.

Referring to FIGS. 3-6 and FIGS. 19-20, in some embodiments, the end cover assembly 1 includes an end cover 11, an electrode terminal 12 and a connection member 13, etc.

The end cover 11 closes the opening at the end part of the case 3. Referring to FIG. 4, in some embodiments, the structure of the end cover 11 of the first end cover assembly is not completely identical to the structure of the end cover 11 of the second end cover assembly. For example, in some embodiments, the end cover 11 of the first end cover assembly is provided with an injection hole 11b for the injection of electrolyte, and the end cover 11 of the second end cover assembly is not provided with an injection hole 11b, but is provided with an vent 18. Of course, in some other embodiments, the injection hole 11b may be arranged on the end cover 11 of the second end cover assembly, and the vent 18 is arranged on the end cover 11 of the first end cover assembly.

Figure 6:
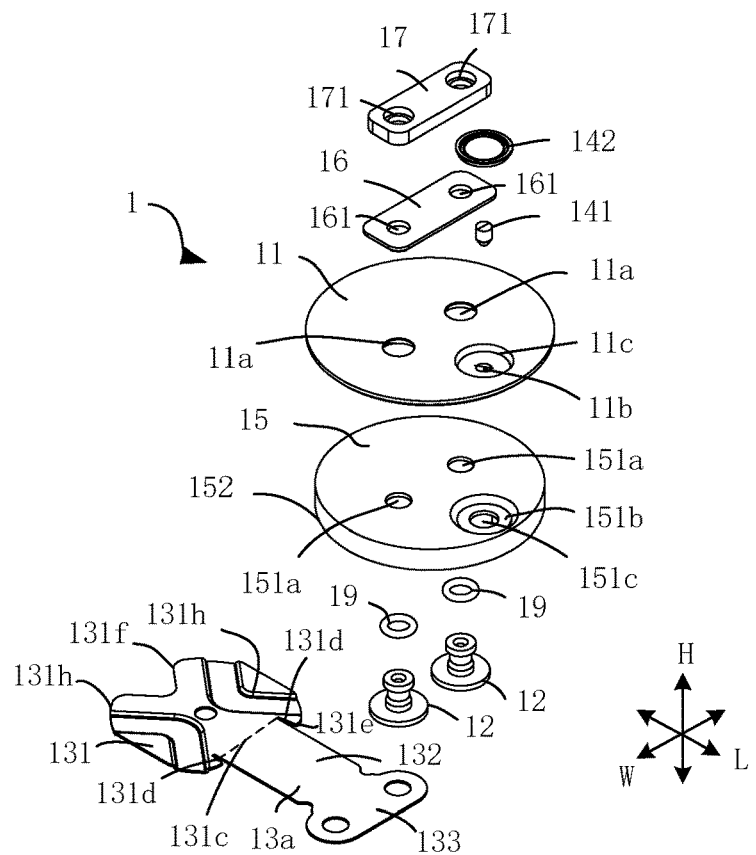
FIG. 6 shows an exploded view of the top cover assembly in FIG. 5 when the connection member is in an expanded state.
Figure 7:
FIG. 7 shows a side view of the connection member in FIG. 6 in an expanded state.
Figure 8:
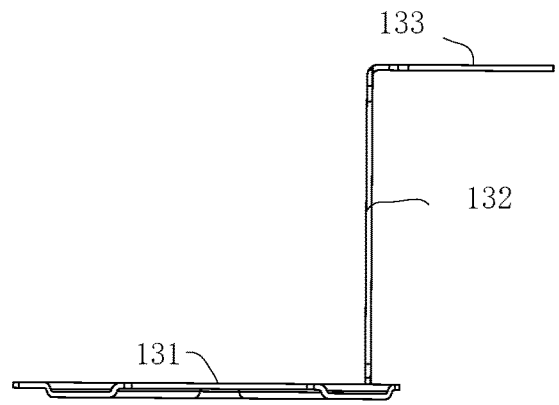
FIG. 8 shows a schematic diagram of the connection member in FIG. 7 when a first connection portion, a second connection portion and a third connection member of the connection member bend relatively.
Figure 9:
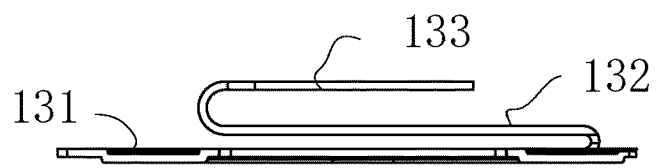
FIG. 9 shows a schematic diagram of the connection member in FIG. 7 in a folded state.
Figure 13:
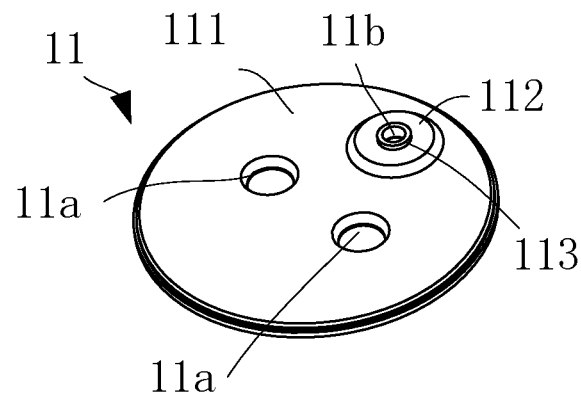
FIG. 13 shows a perspective view of an end cover in FIG. 6.
Figure 14:
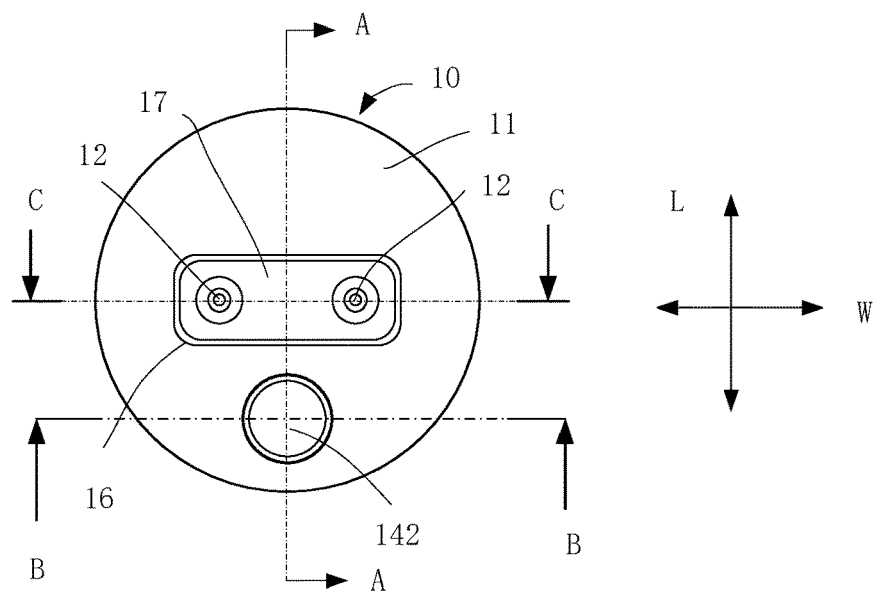
FIG. 14 shows a bottom view of a battery in FIG. 3.

The electrode terminal 12 is arranged on the end cover 11, and electrically connected with the electrode assembly 2 through the connection member 13, so as to realize the electrical connection between the electrode assembly 2 and an external circuit. Referring to FIG. 6 and FIG. 13, in some embodiments, the end cover 11 is provided with an electrode lead-out hole 11a, and the electrode terminal 12 extends into the electrode lead-out hole 11a to realize connection with the end cover 11. Specifically, in some embodiments, the end cover 11 is provided with two electrode lead-out holes 11a, the two electrode lead-out holes 11a are respectively in one-to-one correspondence with two electrode terminals 12, that is, the two electrode terminals 12 respectively extend into two electrode lead-out holes 11a. Moreover, referring to FIG. 6 and FIG. 18, in some embodiments, each electrode lead-out hole 11a is provided with a sealing ring 19, thereby realizing sealing between the electrode terminal 12 and the end cover 11.

The connection member 13 is arranged on a side, adjacent to the electrode assembly 2, of the end cover 11, to electrically connect the electrode assembly 2 with the electrode terminal 12. When the battery 10 is a cylindrical battery, the connection member 13 is configured to be foldable, in other words, the connection member 13 has an expanded state and a folded state, wherein when the connection member 13 is not assembled into a finished battery 10, the connection member 13 is in an expanded state, and after the connection member 13 is assembled into a finished battery 10, the connection member 13 is in a folded state.

Figure 15:
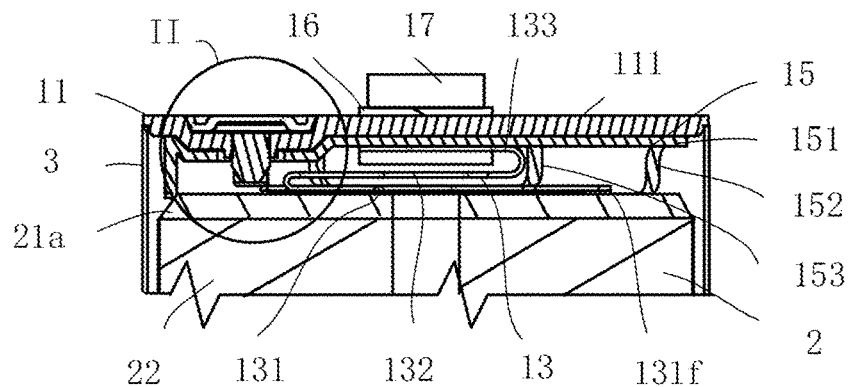
FIG. 15 shows a partial schematic diagram when sectioning is performed at A-A in FIG. 14.

For example, please refer to FIGS. 5-11 and FIGS. 21-23, in some embodiments, the connection member 13 includes a first connection portion 131 and a second connection portion 132. The first connection portion 131 is configured to be electrically connected with the electrode assembly 2 (specifically the tab 21). The second connection portion 132 is configured to be electrically connected with the electrode terminal 12. When the connection member 13 is in an expanded state, the first connection portion 131 and the second connection portion 132 are arranged along the first direction L. Moreover, the first connection portion 131 is bendable relative to the second connection portion 132, and a crease 131c is formed after the two are bent, that is, the first connection portion 131 and the second connection portion 132 are bent relatively at the crease 131c. After the first connection portion 131 is bent relative to the second connection portion 132 along the crease 131c, the first connection portion 131 and the second connection portion 132 are in the folded state. Referring to FIG. 15, in the folded state, the first connection portion 131 is covered on an end face of the electrode assembly 2, and the second connection portion 132 is stacked on a side, far away from the electrode assembly 2, of the first connection portion 131.

Figure 10:
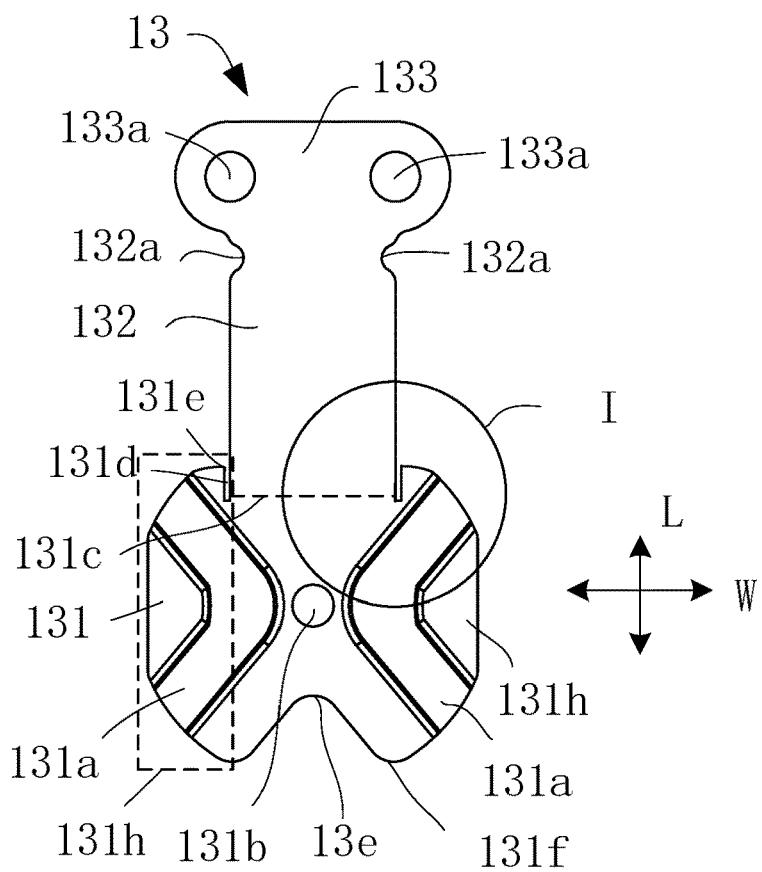
FIG. 10 shows a top view of the connection member in FIG. 6 in an expanded state.
Figure 22:
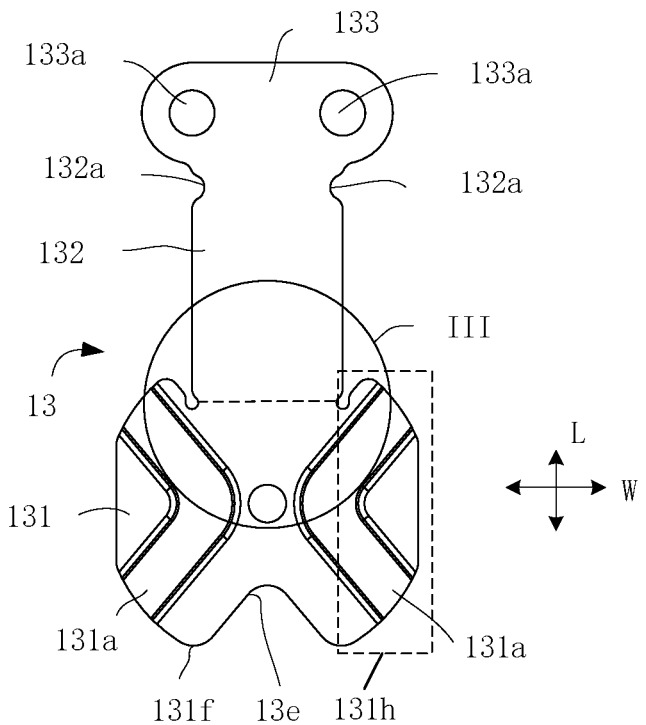
FIG. 22 shows a top view of the connection member shown in FIG. 21 in an expanded state.

Please refer to FIG. 10 and FIG. 22, in some embodiments, the connection member 13 is configured to be a switching piece, the first connection portion 131 is approximately disk-shaped, and the second connection portion 132 is approximately strip-shaped.

Referring further to FIG. 10 and FIG. 22, in some embodiments, the first connection portion 131 protrudes relative to the second connection portion 132 in the third direction W, that is, a width of the first connection portion 131 is larger than a width of the second connection portion 132.

Figure 23:
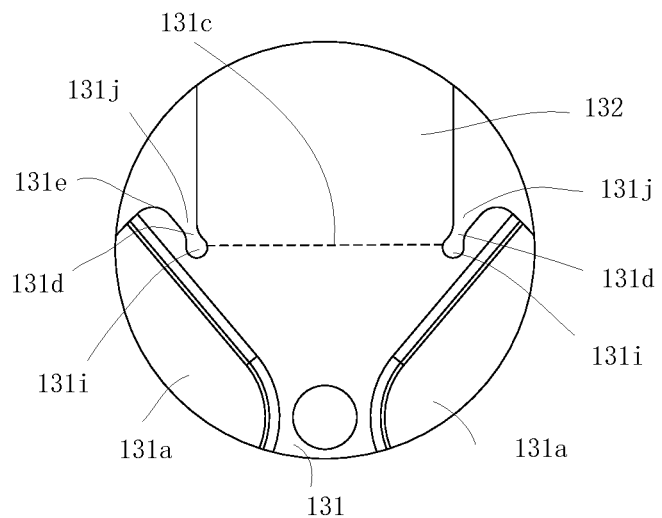
FIG. 23 shows a partial enlarged diagram of III of FIG. 22.

Specifically, please continue to refer to FIG. 10 and FIG. 23, the first connection portion 131 includes a protruding part 131h, and the protruding part 131h protrudes relative to the second connection portion 132 along the third direction W. More specifically, two protruding parts 131h are respectively arranged at two sides, along the third direction W, of the second connection portion 132. The protruding part 131h includes a first end face 131e and a second end face 131f which are opposite along the first direction L, that is, the first end face 131e and the second end face 131f are arranged along the first direction (namely the length direction) L. Moreover, the second end face 131f is far away from the second connection portion 132 relative to the first end face 131e.

Of course, in other embodiments not shown in the figures, the first connection portion 131 may not protrude relative to the second connection portion 132 in the third direction W, that is, the width of the first connection portion 131 is smaller than or equal to that of the second connection portion 132.

In the related technology, the crease 131c is arranged on a side, far away from the second end face 131f, of the first end face 131e, or is arranged at the first end face 131e. In this case, for the bent connection member 13, the part of the first connection portion 131 between the first end face 131e and the second end face 131f completely covers on the end face of the electrode assembly 2, and shields more of the electrode assembly 2, thereby resulting in a slow speed at which the electrolyte enters inside the electrode assembly 2 from the end face of the electrode assembly 2, which influences the infiltration efficiency of the battery 10.

While different from the related technology, in the embodiment of the present application, as shown in FIG. 10 and FIG. 22, when the connection member 13 is in the expanded state, the crease 131c is arranged between the first end face 131e and the second end face 131f. In this way, when the connection member 13 is in the folded state, the part of the first connection portion 131 between the first end face 131e and the second end face 131f does not completely shield the end face of the electrode assembly 2, instead, because of being bent, the part between the first end face 131e and the crease 131c no longer shields the end face of the electrode assembly 2, such that the infiltration speed of the electrolyte is accelerated, and the infiltration efficiency of the battery 10 is improved.

In addition, disposing the crease 131c between the first end face 131e and the second end face 131f is also beneficial for shortening the size along the first direction L (namely length) of the second connection portion 132, thereby reducing the resistance of the battery 10.

Meanwhile, disposing the crease 131c between the first end face 131e and the second end face 131f facilitates evading of the connection member 13 from the injection hole 11b, which is beneficial for improving the injection efficiency.

In the related technology, the crease 131c is arranged on a side, far away from the second end face 131f, of the first end face 131e, or is approximately flush with the first end face 131e, such that after bending, a part of the connection member 13 is just arranged below the injection hole 11b, then in the injection process, the connection member 13 blocks the electrolyte injected via the injection hole 11b, thereby influencing the injection efficiency.

While in the embodiments of the present application, the crease 131c is arranged between the first end face 131e and the second end face 131f, so that the connection member 13 is no longer exactly below the injection hole 11b after being folded, thereby reducing the blocking to the electrolyte by the connection member 13 in the injection process, and improving the injection efficiency.

Figure 5:
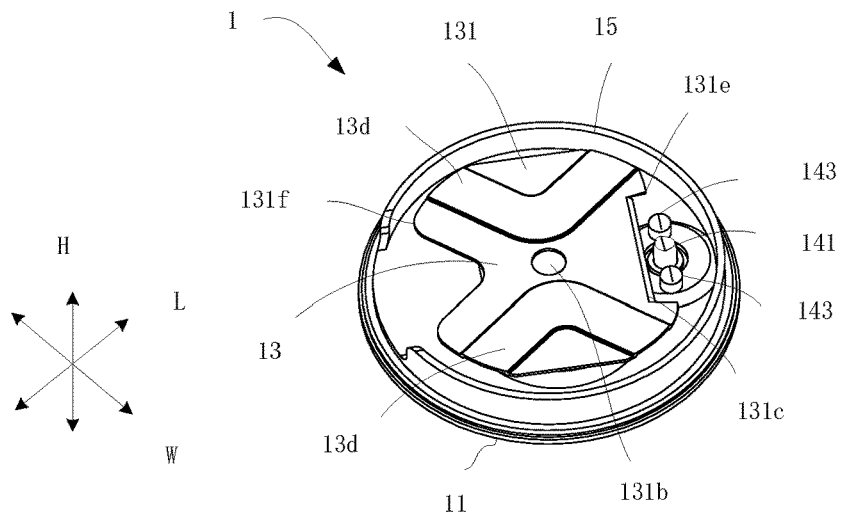
FIG. 5 shows a perspective view of a top cover assembly corresponding to a first tab in FIG. 4.

For example, referring to FIG. 5, in some embodiments, after the first connection portion 131 is bent relative to the second connection portion 132 along the crease 131c, along the axial direction of the injection hole 11b, the projection of the connection member 13 is not overlapped with the projection of the injection hole 11b, in other words, after bending (that is, when the connection member 13 is in the folded state), the projection of the injection hole 11b on the surface vertical to the second direction H is not overlapped with the connection member 13. In this way, in the radial direction of the injection hole 11b, the connection member 13 can evade from the injection hole 11b, thereby reducing blocking to the electrolyte in the injection process, facilitating smooth injection of the electrolyte into the case 3 via the injection hole 11b, so as to improve the injection efficiency.

As an implementing manner of enabling the crease 131c to be arranged between the first end face 131e and the second end face 131f, referring to FIG. 5, FIG. 6, FIG. 10 and FIGS. 19-23, in some embodiments, the first connection portion 131 is provided with at least one first notch 131d, and the at least one first notch 131d is arranged on at least one side, along the third direction W, of the crease 131c. The first notch 131d is arranged on the side, adjacent to the second connection portion 132, of the first connection portion 131. The crease 131c extends to the first notch 131d. In this way, under the effect of the first notch 131d, the first connection portion 131 and the second connection portion 132 can be more conveniently and accurately bent relatively at the crease 131c between the first end face 131e and the second end face 131f.

Specifically, please refer to FIG. 10 and FIG. 22, in some embodiments, two first notches 131d are arranged on the side, adjacent to the second connection portion 132, of the first connection portion 131, the two first notches 131d are respectively arranged at two sides, along the third direction W, of the crease 131c, that is, two ends of the crease 131c along the third direction W are respectively provided one first notch 131d, and moreover, two ends (specifically two ends along the third direction W) of the crease 131c respectively extend to the two first notches 131d. Wherein, the two first notches 131d may be symmetrically arranged at two sides, along the third direction W, of the crease 131c. Based on this, in the relatively bending process, a deflection between the first connection portion 131 and the second connection portion 132 is less likely to occur.

Figure 11:
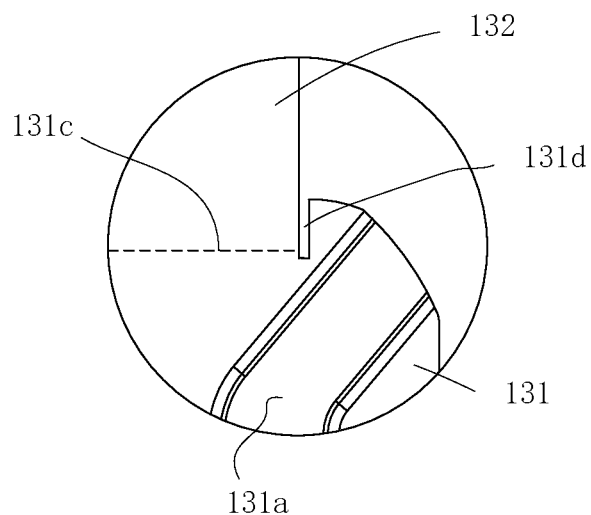
FIG. 11 shows a partial enlarged schematic diagram of I of FIG. 10.

Referring to FIGS. 10-11, in some embodiments, when the connection member 13 is in the expanded state, the first notch 131d extends along the first direction L, or, referring to FIGS. 22-23, in some other embodiments, when the connection member 13 is in the expanded state, the first notch 131d extends along a direction intersected with the first direction L.

Moreover, please continue to refer to FIGS. 22-23, when the first notch 131d extends along the direction intersected with the first direction L, in some embodiments, along a direction from the first end face 131e to the second end face 131f, the first notch 131d inclines towards the middle part of the third direction W of the connection member 13. In this way, a width of the crease 131c is relatively small, thereby facilitating relative bending of the first connection portion 131 and the second connection portion 132 at the crease 131c.

The specific shape of the first notch 131d may be varied.

For example, referring to FIG. 11, in some embodiments, the contour lines of the first notch 131d are all straight lines, and the width of each section of the first notch 131d is basically the same.

For another example, referring to FIGS. 22-23, in some other embodiments, the first notch 131d includes an arc-shaped notch part 131i, and the contour of the arc-shaped notch part 131i is arc-shaped. Wherein, the arc-shaped notch part 131i is for example arranged at an end, adjacent to the second end face 131f, of the first notch 131d, that is, the part, adjacent to the send end face 131f, of the first notch 131d is configured to be the arc-shaped notch part 131i. In this way, not only a processing of the first notch 131d is facilitated, but also a stress concentration is reduced, thereby improving the stress state of the connection member 13, and enhancing the bearing capacity of the connection member 13. Specifically, please continue to refer to FIGS. 22-23, in some embodiments, the first notch 131d further includes a first notch section 131j, the first notch section 131j and the arc-shaped notch part 131i are communicated in sequence along the direction from the first end face 131e to the second end face 131f, and the first notch section 131j is configured to be a non-arc-shaped notch part. In this case, the arc-shaped notch part 131i may also be referred as a second notch section. Wherein, along the direction from the first end face 131e to the second end face 131f, the size along the third direction W (namely the width) of the first notch section 131j is gradually decreased. A rounded corner may be arranged at the connecting part between the first notch section 131j and the arc-shaped notch part 131i, so as to further improve stress concentration.

In addition, please refer to FIGS. 5-11 and FIGS. 19-23, in some embodiments, the connection member 13 further includes a third connection member 133, and the second connection portion 132 is electrically connected with the electrode terminal 12 through the third connection member 133. Moreover, the second connection portion 132 is bendable relative to the third connection member 133, and at this time, the second connection portion 132 is bendable both relative to the first connection portion 131 and the third connection member 133. In this way, when the connection member 13 is in the expanded state, the third connection member 133 is connected to an end, far away from the first connection portion 131, of the second connection portion 132, in other words, the first connection portion 131, the second connection portion 132 and the third connection member 133 are arranged along the first direction L, and are connected in sequence; and when the connection member 13 is in a folded state, the first connection portion 131 covers on the end face of the electrode assembly 2, while the second connection portion 132 is stacked on a side, far away from the electrode assembly 2, of the first connection portion 131, and the third connection member 133 is stacked on a side, far away from the electrode assembly 2, of the second connection portion 132, that is, the second connection portion 132 and the third connection member 133 are stacked on a side, far away from the electrode assembly 2, of the first connection portion 131 in sequence along the direction far away from the electrode assembly 2.

Referring to FIGS. 5-11 and FIGS. 19-23, in some embodiments, the first connection portion 131 is provided with a through hole 131b and a connecting part 13d.

The through hole 131b penetrates through the first connection portion 131 along the second direction H, thereby facilitating location on the one hand, and facilitating flow of the electrolyte on the other hand. In an assembly process, the relative positional relationship between the connection member 13 and the electrode assembly 2 in the first direction L and the third direction W can be determined based on the through hole 131b, for example, the through hole 131b can be aligned with the winding center of the electrode assembly 2. Meanwhile, in the injection process of the electrolyte, the electrolyte can flow to the electrode assembly 2 through the through hole 131b, thereby improving the infiltration efficiency and injection efficiency.

The connecting part 13d is connected with the electrode assembly 2, that is, the first connecting part 131 is connected with the electrode assembly 2 through the connecting part 13d. The connecting part 13d and the electrode assembly 2 are connected by welding or riveting.

In some embodiments, the connecting part 13d is a boss which protrudes towards one side of the electrode assembly 2, of the first connection portion 131, so as to further facilitate the welding between the connecting part 13d and the tab 21. At this time, the connecting part 13d may be formed by stamping, and after stamping, the surface, far away from the electrode assembly 2, of the first connecting part 131 is formed with a groove 131a, and the connecting part 13d and the groove 131a are correspondingly arranged in a thickness direction of the connection member 13. In some embodiments, the groove 131a is V-shaped.

Continue to refer to FIGS. 5-11 and FIGS. 19-23, in some embodiments, at least part of the connecting part 13d is arranged on the protruding part 131h, that is, in the third direction W, the connecting part 13d protrudes relative to the crease 131c.

In addition, referring to FIG. 10 and FIG. 22, in some embodiments, when the connection member 13 is in the expanded state, along the direction from the first connection portion 131 to the second connection portion 132, that is, along the direction from the second end face 131f to the first end face 131e, the groove 131a protrudes relative to the crease 131c, since the connecting part 131d is corresponding to the groove 131a, the connecting part 13d also protrudes relative to the crease 131c, in other words, in the first direction L, the connecting part 13d extends to the side, adjacent to the first end face 131e, of the crease 131c. In this way, the crease 131c is arranged between the first end face 131e and the second end face 131f, thus the infiltration efficiency being improved, and the connecting part 13d and the tab 21 have a bigger connecting area, thereby enhancing the connecting reliability between the connecting part 13d and the tab 21, and improving the overcurrent capacity of the battery 10.

Figure 21:
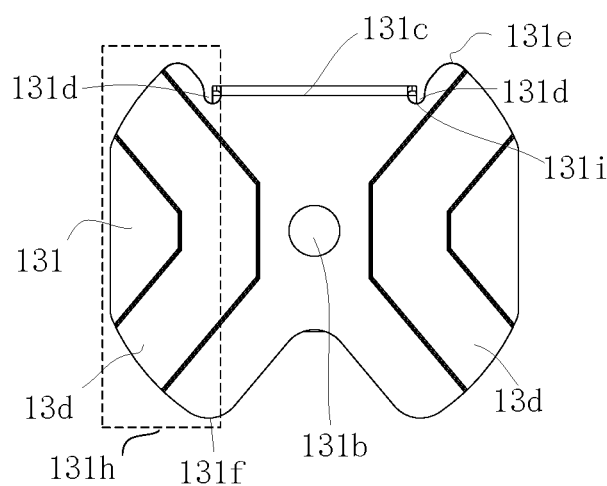
FIG. 21 shows a bottom view of a connection member in FIG. 20.

Specifically, please refer to FIG. 5 and FIG. 21, in some embodiments, the first connection portion 131 is provided with two connecting parts 13d, and the two connecting parts 13d are symmetrically arranged on the first connection portion 131. For example, in some embodiments, two connecting parts 13d are arranged on the first connection portion 131, and are arranged symmetrically relative to the through hole 131b.

In addition, referring to FIG. 10 and FIG. 22, in some embodiments, a third notch 13e is arranged between the second end faces 131f of the two protruding parts 131h of the first connecting part 131, and the third notch 13e is concave along the direction from the second end face 131f to the first end face 131e. This setting has the following advantages: on the one hand, for the first end cover assembly, shielding to the end face of the electrode assembly 2 by the first connection portion 131 is reduced, thereby the infiltration efficiency being improved, on the other hand, for the second end cover assembly, the third notch 13e is arranged on a side, adjacent to the electrode assembly 2, of the vent 18, thereby facilitating a high-pressure gas to act on the vent 18, and enabling the vent 18 to be opened more reliably under a preset pressure.

Please refer to FIG. 6, FIG. 10, FIG. 18 and FIG. 22, in some embodiments, the third connecting part 133 is provided with first connecting holes 133a, the first connecting holes 133a and the electrode terminals 12 are in one-to-one correspondence with each other, and the electrode terminal 12 penetrates through the first connecting hole 133a, to realize the connection between the third connection member 133 and the electrode terminal 12. In some embodiments, the third connection member 133 is also configured to be disk-shaped with a width greater than that of the second connection portion 132.

To facilitate relative bending of the third connection member 133 and the second connection portion 132, referring to FIG. 10 and FIG. 22, in some embodiments, a second notch 132a is arranged at the connecting part between the third connection member 133 and the second connection portion 132. The second notch 132a extends from the edge, along the third direction W, of the second connection portion 132 to the middle, along the third direction W, of the second connection portion 132, that is, the second notch 132a is concave from the edge, along the third direction W, of the second connection portion 132 to the middle, along the third direction W, of the second connection portion 132. Moreover, please refer to FIG. 10 and FIG. 22, in some embodiments, two sides of the second connection portion 132 along the third direction W are respectively provided with one second notch 132a, that is, two second notches 132a are arranged at two sides, along the third direction W, of the second connection portion 132. In this way, the third connection member 133 and the second connection portion 132 can be bent relatively more conveniently at the second notch 132a.

Figure 20:
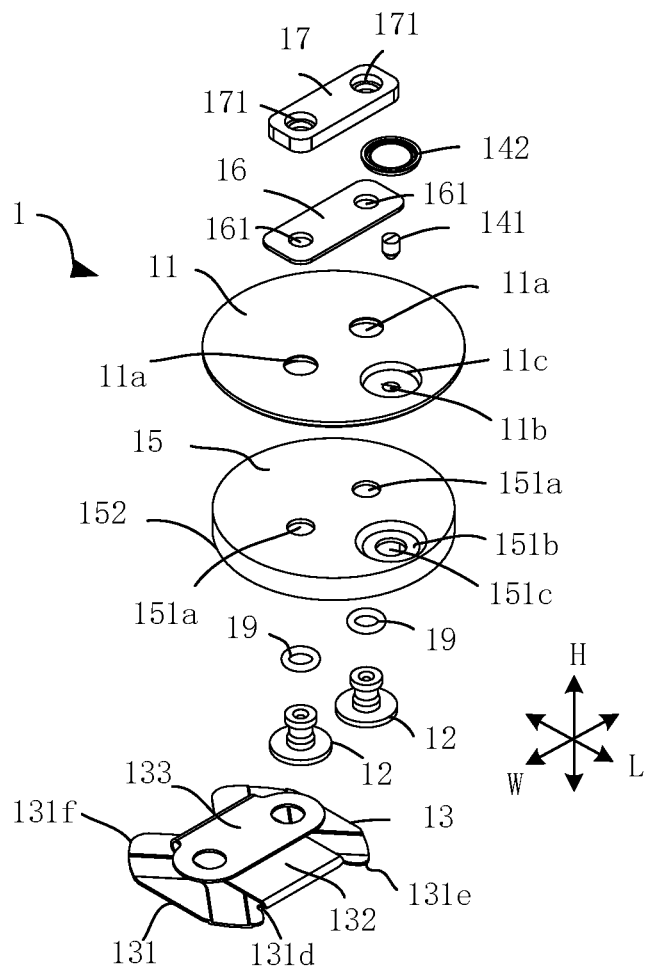
FIG. 20 shows an exploded view of a top cover assembly in FIG. 19.

In addition, referring to FIG. 6 and FIG. 20, in some embodiments, the end cover assembly 1 further includes a first insulating member 15, a second insulating member 16, a connecting block 17 and a hole plug 141, etc.

The first insulating member 15 and the second insulating member 16 are respectively located at the sides, adjacent to and far away from the electrode assembly 2, of the end cover 11, to play an effect of insulation, and reduce the risk of short circuit.

The first insulating member 15 and the second insulating member 16 may be made of such insulating materials as plastics.

Figure 12:
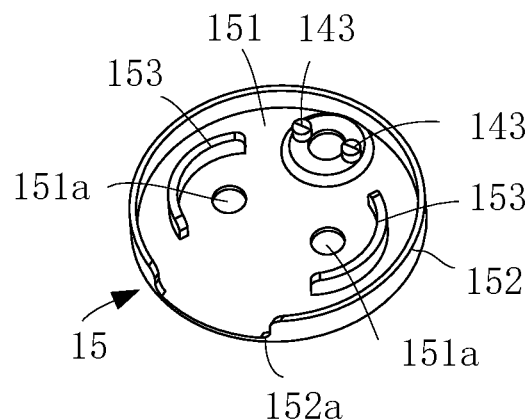
FIG. 12 shows a perspective view of a first insulating member in FIG. 6.

Referring to FIG. 12, in some embodiments, the first insulating member 15 includes an insulating body 151 and a limiting ring 152 and a supporting part 153 which are arranged on the insulating body 151.

Matching with the overall shape of the cylindrical battery, the insulating body 151 is approximately circular. Moreover, please refer to FIG. 6, FIG. 12 and FIG. 18, the insulating body 151 is provided with a second connecting hole 151a, and the electrode terminal 12 penetrates through the second connecting hole 151a. The second connecting hole 151a and the electrode terminal 12 are in one-to-one correspondence.

The limiting ring 152 is configured to limit lateral displacement (that is, displacement in the plane vertical to the second direction H) of the connection member 13, so as to reduce the risk of short circuit. Please refer to FIG. 5, FIG. 12, FIG. 16 and FIG. 19, the limiting ring 152 protrudes towards a direction close to the electrode assembly 2 relative to the insulating body 151, and is arranged on a periphery of the connection member 13, so as to prevent the connection member 13 from contacting with the case 3, thus avoiding a contact between the connection member 13 and the case 3 in cases such as the battery 10 is shaken and the connection member 13 is folded, which may cause short circuit problem.

Specifically, please refer to FIG. 5, FIGS. 15-16 and FIG. 19, the inner diameter of the limiting ring 152 is greater than the maximum size, along the first direction L and the third direction W, of the folded connection member 13, and the limiting ring 152 extends to a side, adjacent to the electrode assembly 2, of the first connection portion 131 from the insulating body 151 towards the side of the electrode assembly 2, such that the limiting ring 152 is arranged around the periphery of the first connection portion 131. In this way, the folded connection member 13 is overally arranged in the range defined by the limiting ring 152, such that the limiting ring 152 can limit the lateral displacement of the connection member 13 to a certain extent, thereby preventing the connection member 13 from contacting with the case 3 due to an overlarge lateral displacement.

Figure 16:
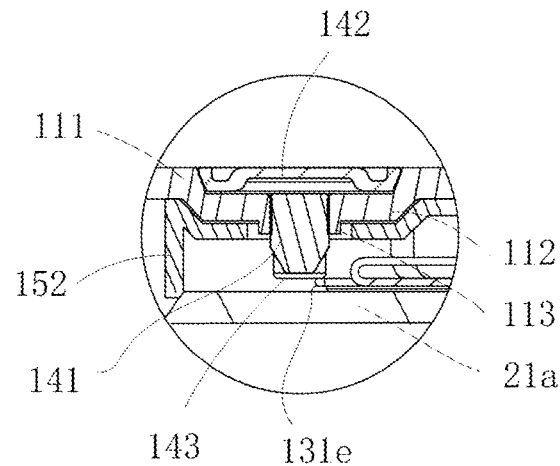
FIG. 16 shows a partial enlarged schematic diagram of II in FIG. 15.

More specifically, with reference to FIG. 16, in some embodiments, the limiting ring 152 not only extends to the side, adjacent to the electrode assembly 2, of the first connection portion 131, but also extends to the end, adjacent to the end cover 11, of the tab 21. At this time, the limiting ring 152 is not only arranged around the periphery of the connection member 13, but also is arranged around the periphery of the end, adjacent to the end cover 11, of the tab 21, such that the limiting ring 152 can limit to a certain extent the lateral displacement of the electrode assembly 2 while limiting the lateral displacement of the connection member 13, thereby preventing the problem of short circuit caused by the contact between the electrode assembly 2 and the case 3 due to an overlarge lateral displacement, and preventing the problem of short circuit caused by bending of the tab 21a towards the case 3.

Referring to FIG. 12, in some embodiments, the limiting ring 152 is configured as a continuous circular ring, but at the same time, the limiting ring 152 is an unclosed circular ring, and an extending opening 152a is arranged between two free ends of the limiting ring 152, to allow the second connection portion 132 of the expanded connection member 13 to extend outside. Based on this, the limiting ring 152 not only can reliably limit lateral displacement of the connection member 13, reducing the risk of short circuit, but also can facilitate the connection member 13 to be firstly assembled into the end cover assembly 1 in an expanded state and then to be folded.

Figure 18:
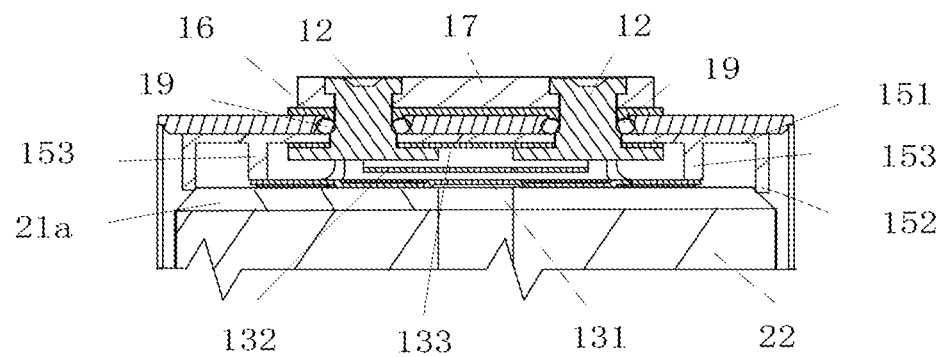
FIG. 18 shows a partial schematic diagram when sectioning is performed at C-C in FIG. 14.
Figure 19:
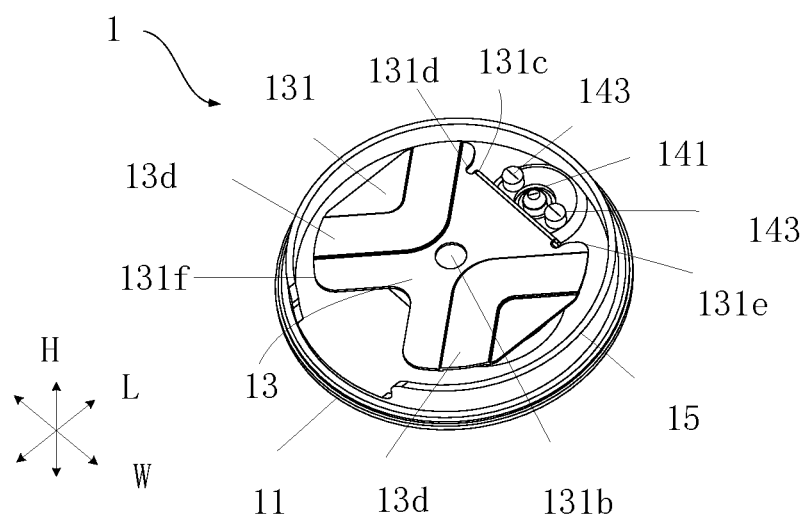
FIG. 19 shows a perspective view of a top cover assembly corresponding to a first tab in some other embodiments of the present application.

The supporting part 153 is configured to limit a longitudinal displacement (that is, displacement along the second direction H) of the electrode assembly 2, so as to prevent an overlarge longitudinal displacement of the electrode assembly 2 which may influence the performance and using safety of the battery 10. With reference to FIG. 12 and FIG. 18, the supporting part 153 protrudes towards the direction close to the electrode assembly 2 relative to the insulating body 151, and is supported between the insulating body 151 and the first connection portion 131. In this way, the supporting part 153 limits the longitudinal displacement of the electrode assembly 2 by butting against the first connection portion 131, thereby being beneficial for reducing shaking of the electrode assembly 2, and enabling the battery 10 to work more safely and reliably.

Specifically, please refer to FIG. 12, in some embodiments, the supporting part 153 is constructed to be an arc-shaped section, at this time, the contact area between the supporting part 153 and the first connection portion 131 is relatively large, such that the longitudinal displacement of the electrode assembly 2 is limited more reliably.

In addition, referring to FIG. 12 and FIG. 15, in some embodiments, the insulating body 151 is provided with two supporting parts 153, and the two supporting parts 153 are opposite arranged at two sides of the second connection portion 132, so as to abut against and limit the first connection portion 131 more stably. For example, with reference to FIG. 12, in some embodiments, the supporting part 153 is located between the limiting ring 152 and the second connecting hole 151a, and the two supporting parts 153 are arranged symmetrically relative to the center of the insulating body 151. At this time, the two supporting parts 153 are both arranged at the inner side of the limiting ring 152, and are opposite to each other, and can be more stably supported between the insulating body 151 and the first connection portion 131, thereby abutting against and limiting the first connection portion 131 more stably and reliably.

Referring to FIG. 12, in some embodiments, the supporting part 153 and an inner surface of the limiting ring 152 are arranged at intervals. To further increase a contact area of the supporting part 153 and the first connection portion 131, with reference to FIG. 24, in some other embodiments, the supporting part 153 is in contact with the inner surface of the limiting ring 152. It can be known from comparison of FIG. 12 and FIG. 24 that, under the premise that the radial distance between the supporting part 153 and the center of the insulating body 151 is unchanged, when the supporting part 153 is changed to be in contact with the inner surface of the limiting ring 152 from being arranged at intervals with the inner surface of the limiting ring 152, a radial width of the supporting part 153 is increased, in this way, the surface area of the supporting part 153 contacting with the first connection portion 131, is increased, so that the first connection portion 131 can be abutted against and limited more reliably.

In addition, referring to FIG. 25, in some embodiments, the insulating body 151 is provided with a weight reduction groove 154, and the weight reduction groove 154 is concave from the end face, far away from the electrode assembly 2, of the insulating body 151 towards the direction where the electrode assembly 2 is located. On the one hand, the weight reduction groove 154 can reduce a weight of the first insulating member 15, thereby reducing the weight of the battery 10, and on the other hand, when the first insulating member 15 is molded through injection molding, the weight reduction groove 154 can further prevent the first insulating member 15 from producing shrinkage marks during injection molding.

With reference to FIG. 25, in some embodiments, the weight reduction groove 154 includes at least two groove sections 154*a*, and the at least two groove sections 154*a* are arranged along a circumference of the insulating body 151.

Please continue to refer to FIG. 25, in some embodiments, the insulating body 151 is provided with two weight reduction grooves 154, the two weight reduction grooves 154 are arranged on two sides of the center of the insulating body 151, and are opposite to each other, that is, the two weight reduction grooves 154 are symmetrically arranged relative to the center of the insulating body 151. In this way, weight can be more sufficiently reduced, and injection molding shrinkage marks can be more effectively prevented.

As can be seen in combination with FIG. 24 and FIG. 25, in some embodiments, the insulating body 151 is simultaneously provided with the weight reduction groove 154 and the supporting part 153. At this time, the weight reduction groove 154 and the supporting part 153 are arranged one by one in correspondence. The weight reduction groove 154 and the supporting part 153 are respectively arranged at two axial end faces of the insulating body 151 with the same circumferential and radial position and the same circumferential and radial size. In this way, even if the thickness of the supporting part 153 is relatively large, the weight reduction groove 154 still can effectively reduce weight and prevent shrinkage marks.

The second insulating member 16 and the connecting block 17 are disposed on the end cover 11, and are arranged in sequence along the direction far away from the electrode assembly 2, that is, the second insulating member 16 is arranged between the connecting block 17 and the end cover 11, and is configured to realize insulation between the end cover 11 and the connecting block 17. With reference to FIG. 6, a third connecting hole 161 and the fourth connecting hole 171 are disposed on the second insulating member 16 and the connecting block 17 respectively. The third connecting hole 161 and the fourth connecting hole 171 are both arranged to be in one-to-one correspondence with the electrode terminal 12. The electrode terminal 12 extends out from the electrode lead-out hole 11*a*, and penetrates through the third connecting hole 161 and the fourth connecting hole 171 successively, thereby realizing the connection between the second insulating piece 16 and the connecting block 17.

The hole plug 141 is configured to seal the injection hole 11*b*. As shown in FIG. 16, the hole plug 141 extends into the injection hole 11*b*, and penetrates out from the side, adjacent to the electrode assembly 2, of the injection hole 11*b*. After injection, the hole plug 141 is inserted into the injection hole 11*b* to prevent the injected electrolyte from flowing out from the injection hole 11*b*, which results in leakage.

Meanwhile, referring to FIG. 6 and FIGS. 15-17, in some embodiments, the end cover assembly 1 further includes a plugging member 142, and the plugging member 142 is arranged on the end cover 11, and plugs the axial end face, far away from the electrode assembly 2, of the injection hole 11*b*. For example, the plugging member 142 is arranged on an end, far away from the electrode assembly 2, of the hole plug 141, and is connected with the end cover 11. Based on this, the plugging member 142 can improve the sealing effect on the injection hole 11*b*, and meanwhile can also reduce the risk of falling off of the hole plug 141. In addition to playing the sealing effect, the plugging member 142 can further prevent the hole plug 141 from escaping from the injection hole 11*b* by limiting a displacement of the hole plug 141 towards the side far away from the electrode assembly 2, which is beneficial for further improving the sealing effect, and reducing the leakage risk of the electrolyte.

For realizing the connection between the plugging member 142 and the end cover 11, with reference to FIG. 6, in some embodiments, the end cover 11 is provided with an accommodation groove 11*c*, and the plugging member 142 is accommodated in the accommodation groove 11*c*, and is welded on the end cover 11. In this way, the plugging member 142 can be more stably fixed on the end cover 11, so as to more reliably improve the sealing effect and prevent the hole plug 141 from falling off.

Further referring to FIG. 5 and FIG. 16, in some embodiments, when the connection member 13 is in the folded state, along the axial direction of the injection hole 11*b*, the projection of the connection member 13 is not overlapped with the projection of the hole plug 141, that is, the projection of the hole plug 141 on the plane vertical to the axial direction of the injection hole 11*b* is not overlapped with the connection member 13, which is beneficial for reducing the risk of collision between the connection member 13 and the hole plug 141 when the connection member 13 moves toward the side far away from the electrode assembly 2 under such conditions as shaking, thereby avoiding the connection member 13 from influencing the installation of the plugging member 142 and the installation reliability of the plugging member 142, and realizing a tighter sealing effect.

To improve the setting reliability of the hole plug 141, with reference to FIG. 13 and FIG. 16, in some embodiments, the end cover 11 includes a body part 111, a first boss 112 and a second boss 113, the first boss 112 protrudes from the body part 111 towards the side where the electrode assembly 2 is located, the second boss 113 protrudes from the first boss 112 towards the side where the electrode assembly 2 is located, and the injection hole 11*b* penetrates through the first boss 112 and the second boss 113. Through additionally adding a second boss 113 on the basis of the body part 111 and the first boss 112, and configuring the injection hole 11*b* to penetrate through the first boss 112 and the second boss 113, an axial length of the injection hole 11*b* is increased, such that the contact area between the hole plug 141 and the injection hole 11*b* is increased, and the risk of falling off of the hole plug 141 is reduced, thereby realizing more reliable setting of the hole plug 141 in the injection hole 11*b*. In this case, referring to FIG. 6 and FIG. 16, in some embodiments, a matching groove 151*b* is disposed on the insulating body 151, the matching groove 151*b* which may be formed by stamping is configured to accommodate the first boss 112, so as to realize a closer cooperation between the end cover 11 and the first insulating member 15.

Figure 17:
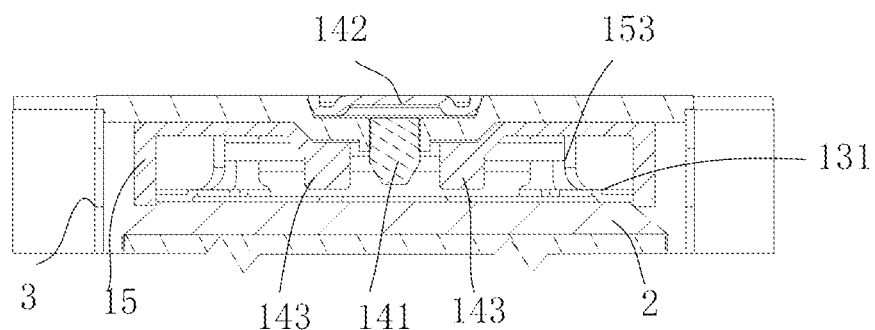
FIG. 17 shows a partial schematic diagram when sectioning is performed at B-B in FIG. 14.

In addition, with reference to FIG. 17, in some embodiments, the battery 10 further includes a protection member 143, and the protection member 143 is configured to prevent the hole plug 141 from contacting with the connection member 13. The protection member 143 protrudes towards the direction close to the electrode assembly 2 relative to the hole plug 141, that is, an end of the protection member 143 adjacent to the electrode assembly 2, is closer to the electrode assembly 2 than an end of the hole plug 141 adjacent to the electrode assembly 2, or, in other words, in the second direction H, the distance between the protection member 143 and the electrode assembly 2 is smaller than that between the hole plug 141 and the electrode assembly 2. In this way, the protection member 143 can protect the hole plug 141 to a certain extent, and prevent falling off of the hole plug 141 due to being collided by other structural parts in the case 3 such as the connection member 13 or the electrode assembly 2, which moves upward in the shaking process of the battery 10, that is, the protection member 143 can reduce the falling off risk of the hole plug 141 by preventing other structural parts in the case 3 from directly impacting the hole plug 141, what's more, the hole plug 141 is prevented from moving towards a direction far away from the electrode assembly 2 due to the impact, such that influences on the installation of the plugging member 142 and the installation reliability of the plugging member 142 are avoided, thereby a tighter sealing effect being realized.

In some embodiments, the protection member 143 is arranged on the first insulating member 15, and protrudes from the first insulating member 15 towards a side close to the electrode assembly 2. Specifically, with reference to FIG. 12 and FIG. 17, the protection member 143 is arranged on the insulating body 151, and protrudes from the insulating body 151 towards the side where the electrode assembly 2 is located. More specifically, the protection member 143 is arranged on the boss which is formed through stamping the above-mentioned matching groove 151b. The protection member 143 may be constructed as a convex column. At this time, referring to FIG. 5, FIG. 6 and FIG. 16, in some embodiments, the insulating body 151 is provided with a matching hole 151c, and the hole plug 141 penetrates through the matching hole 151c, and extends out through the side, adjacent to the electrode assembly 2, of the matching hole 151c, however, the bottom end of the hole plug 141 is still higher than the bottom end of the protection member 143, such that when the electrode assembly 2 moves upwards, the protection member 143 can be in contact with the connection member 13 prior to the hole plug 141, thus preventing the hole plug 141 from being impacted by the connection member 13, etc, and playing a protective effect. The matching hole 151c for example penetrates through the boss formed by stamping the above-mentioned matching groove 151b.

In addition, the number of the protection member 143 is not specifically defined, and may be one, two or more. For example, with reference to FIG. 12 and FIG. 17, in some embodiments, the battery 10 includes two protection members 143, and the two protection members 143 are arranged at two sides of the injection hole 11b relatively, to protect the hole plug 141 more stably and reliably.

Referring to FIG. 26, the manufacturing method of the battery 10 provided in embodiments of the present application includes the following steps:

S110, bending the first connection portion 131 relative to the second connection portion 132 at the position between the first end face 131e and the second end face 131f of the first connection portion 131.

The above are merely exemplary embodiments of the present application, and are not used for limiting the present application. For any modifications, equivalent substitutions and improvements made within the spirit and principle of the present application, the parameters shall all fall within the protection scope of the present application.

What is claimed is:

1. A battery, comprising:
   an electrode assembly;
   an end cover having an electrode terminal and an injection hole;
   a connection member, comprising:
      a first connection portion configured to be electrically connected with the electrode assembly,
      a second connection portion configured to be electrically connected with the first connection portion, and
      a third connection portion configured to be electrically connected with the second connection portion and the electrode terminal,
   wherein a first crease is located between the first connection portion and the second connection portion, and a second crease is located between the second connection portion and the third connection portion,
   wherein two first notches are located at two ends of the first crease, wherein the two first notches extend into the first connection portion and the second connection portion,
   wherein when the connection member is folded from the expanded state, the second connection portion is folded at the first crease to become substantially parallel to the first connection portion, and the third connection portion is folded at the second crease to become substantially parallel to the second connection portion;
   and
   a first insulating member arranged at a side of the end cover of the battery adjacent to the electrode assembly, the first insulating member comprises an insulating body and a limiting ring, and the limiting ring protrudes toward a direction close to the electrode assembly relative to the insulating body, and is arranged on a periphery of the connection member, so as to prevent the connection member from contacting with a case of the battery,
   wherein the limiting ring is an unclosed circular ring, and an extending opening is arranged between two free ends of the limiting ring, to allow the second connection portion of the expanded connection member to extend outside.

2. The battery as claimed in claim 1, wherein either of the two first notches comprises an arc-shaped notch part, and an outline of the arc-shaped notch part is arc-shaped.

3. The battery as claimed in claim 1, wherein the first connection portion comprises a protruding part, and the protruding part protrudes out of the second connection portion along a width direction of the connection member.

4. The battery as claimed in claim 1, wherein the connection member comprises a connecting part, the connecting part is configured to be connected with the electrode assembly, and when the connection member is in the expanded state, the connecting part protrudes out of the crease along a direction from the first connection portion to the second connection portion.

5. The battery as claimed in claim 1, wherein the projection of the connection member is not overlapped with a projection of a hole plug along the axial direction of the injection hole, wherein the hole plug extends into the injection hole and penetrates out from a side of the injection hole adjacent to the electrode assembly.

6. The battery as claimed in claim 5, further comprising a protection member configured to prevent the hole plug from contacting with the connection member after the connection member is folded.

7. The battery as claimed in claim 1, wherein the limiting ring is arranged on a periphery of an end, adjacent to the end cover, of a tab of the electrode assembly.

8. The battery as claimed in claim 1, wherein the insulating body is provided with a weight reduction groove, and the weight reduction groove is concave towards a direction where the electrode assembly is located from an end face of the insulating body far away from the electrode assembly.

9. The battery as claimed in claim 1, wherein the end cover comprises a body part, a first boss, and a second boss, the first boss protrudes from the body part towards a side where the electrode assembly is located, the second boss protrudes from the first boss towards a side where the electrode assembly is located, and the injection hole penetrates through the first boss and the second boss.

10. A battery module, comprising the battery as claimed in claim 1.

11. An electric equipment, comprising the battery module as claimed in claim 10, wherein the battery module is configured to provide electric energy.

12. The battery as claimed in claim 1, wherein the first insulating member comprises a supporting part disposed on the insulating body, and the supporting part protrudes from the insulating body towards a direction where the electrode assembly is located, and is supported between the insulating body and the first connection portion.

13. The battery as claimed in claim 12, wherein the supporting part and an inner surface of the limiting ring are arranged at intervals, or the supporting part is in contact with an inner surface of the limiting ring.

* * * * *